United States Patent
Lowe

(10) Patent No.: US 7,517,013 B1
(45) Date of Patent: Apr. 14, 2009

(54) COMBINATION COOLING PAD FOR A VEHICLE SEAT AND COOLED, DUAL-CONFIGURATION BAG

(75) Inventor: Deborah H. Lowe, Phoenix, AZ (US)

(73) Assignee: DD&G Holdings 1, LLC, Phoenix, AZ (US)

( * ) Notice: Subject to any disclaimer, the term of this patent is extended or adjusted under 35 U.S.C. 154(b) by 0 days.

(21) Appl. No.: 12/023,945

(22) Filed: Jan. 31, 2008

(51) Int. Cl.
 *A47C 31/00* (2006.01)
(52) U.S. Cl. .............................. 297/180.11; 297/188.2; 297/228.1; 297/230.1
(58) Field of Classification Search ............ 297/180.11, 297/180.1, 88.2, 225, 228.1, 230.1, 230.13, 297/352
See application file for complete search history.

(56) References Cited

U.S. PATENT DOCUMENTS

| | | | | | |
|---|---|---|---|---|---|
| 1,745,590 | A | * | 2/1930 | Stanger | 190/100 |
| 3,489,194 | A | * | 1/1970 | Hoover | 383/4 |
| 3,763,972 | A | * | 10/1973 | Karzmar | 190/8 |
| 4,468,810 | A | * | 8/1984 | Longo | 383/3 |
| 4,604,987 | A | * | 8/1986 | Keltner | 126/204 |
| 4,671,393 | A | * | 6/1987 | Rainey | 190/1 |
| 4,723,300 | A | * | 2/1988 | Aranow | 383/4 |
| 4,863,003 | A | * | 9/1989 | Carter | 190/8 |
| 5,110,219 | A | * | 5/1992 | Lopes | 383/4 |
| 5,168,590 | A | | 12/1992 | O'Sullivan | |
| 5,370,460 | A | * | 12/1994 | Nelson | 383/4 |
| 5,588,749 | A | * | 12/1996 | Ishikawa | 383/4 |
| 5,639,145 | A | * | 6/1997 | Alderman | 297/452.45 |
| 5,833,309 | A | | 11/1998 | Schmitz | |
| 5,843,556 | A | * | 12/1998 | Levas | 428/99 |
| 6,007,572 | A | * | 12/1999 | Baldwin | 607/114 |
| 6,129,452 | A | * | 10/2000 | Hakulin | 383/4 |
| 6,135,635 | A | * | 10/2000 | Miller et al. | 383/2 |
| 6,244,481 | B1 | * | 6/2001 | Brougher | 224/153 |
| 6,367,083 | B1 | * | 4/2002 | November | 2/69.5 |
| 6,422,032 | B1 | | 7/2002 | Greene | |
| 6,463,605 | B2 | * | 10/2002 | Swagger, Jr. | 5/420 |
| 6,626,491 | B1 | * | 9/2003 | Blome et al. | 297/229 |
| 6,676,209 | B1 | * | 1/2004 | Szabo et al. | 297/219.1 |

(Continued)

OTHER PUBLICATIONS

"Seat Chiller Child Car Seat Cooler" product found at website www.babydagny.com; Sep. 2007.

(Continued)

*Primary Examiner*—Laurie K Cranmer
(74) *Attorney, Agent, or Firm*—Louis J. Hoffman; David S. Alavi

(57) ABSTRACT

A combination cooling pad and bag comprises a flexible pad with pockets, cooling packs in the pockets, handles on opposing edges of the pad, and closure mechanisms on the edges and surface of the pad. A handle is sized to loop around a vehicle seat headrest and suspend the pad to cover a substantial portion of the seat and backrest portions of the vehicle seat. The pad, handles, and the edge closure mechanism are arranged, with the edge closure mechanism engaged and with the pad in a single-fold configuration, to form a single-compartment bag with the pair of handles positioned next to one another. The pad, handles, and the surface closure mechanism are arranged, with the surface closure mechanism engaged and with the pad in a multiple-fold configuration, to form a dual-compartment bag with the pair of handles positioned next to one another.

16 Claims, 5 Drawing Sheets

U.S. PATENT DOCUMENTS

| | | | |
|---|---|---|---|
| 6,848,746 B2 * | 2/2005 | Gentry | 297/380 |
| D513,146 S | 12/2005 | Griffin | |
| 7,097,244 B2 | 8/2006 | Holmgren et al. | |
| 7,131,689 B2 | 11/2006 | Brennan et al. | |
| 2003/0057750 A1 | 3/2003 | Blackler | |
| 2005/0039260 A1 | 2/2005 | Tyler | |

OTHER PUBLICATIONS

"Cold Saet Freezable Car Seat Cooler" product found at website www.bargains4babies.com; Sep. 2007.

"BabyBeeCool Car Seat Cooler Pad" product found at webiste www.babybeecool.com; 2007.

FAQ page from www.babybeecool.com; 2007.

* cited by examiner

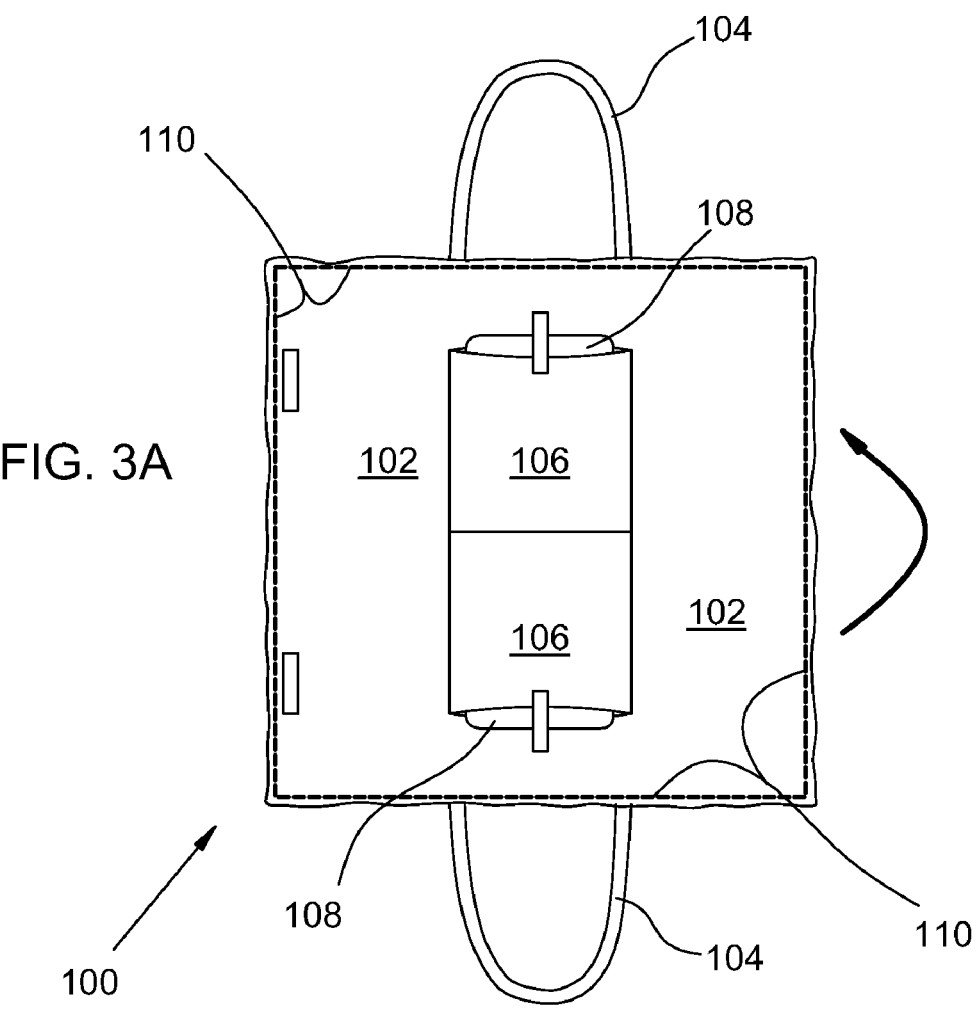
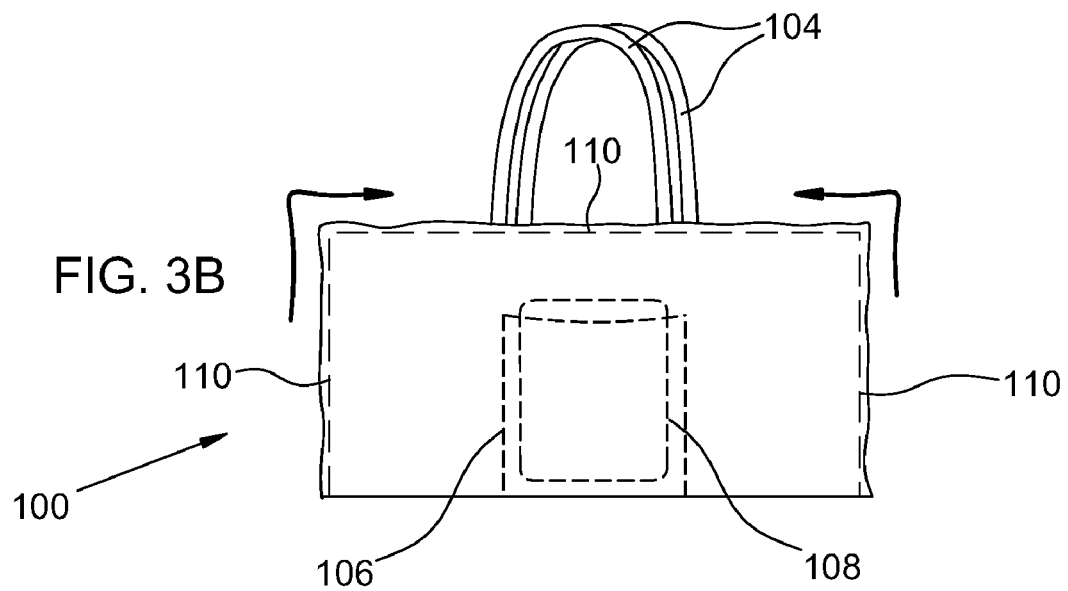

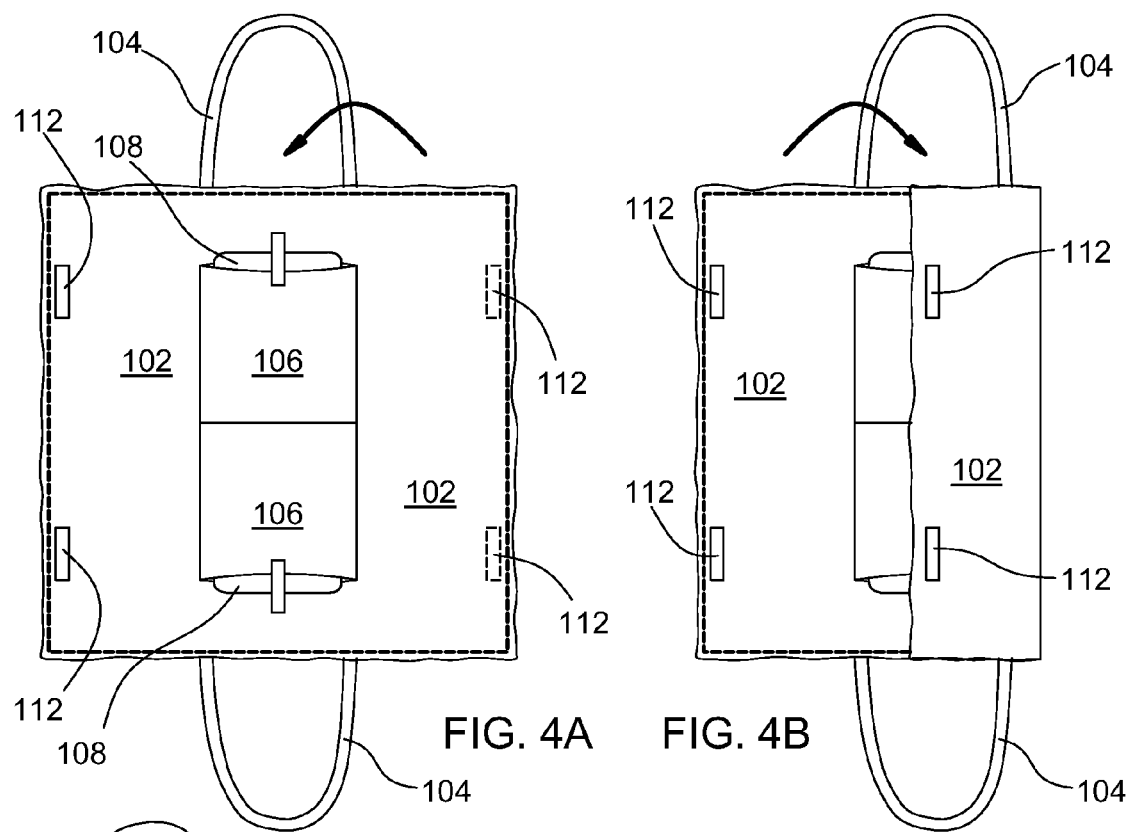
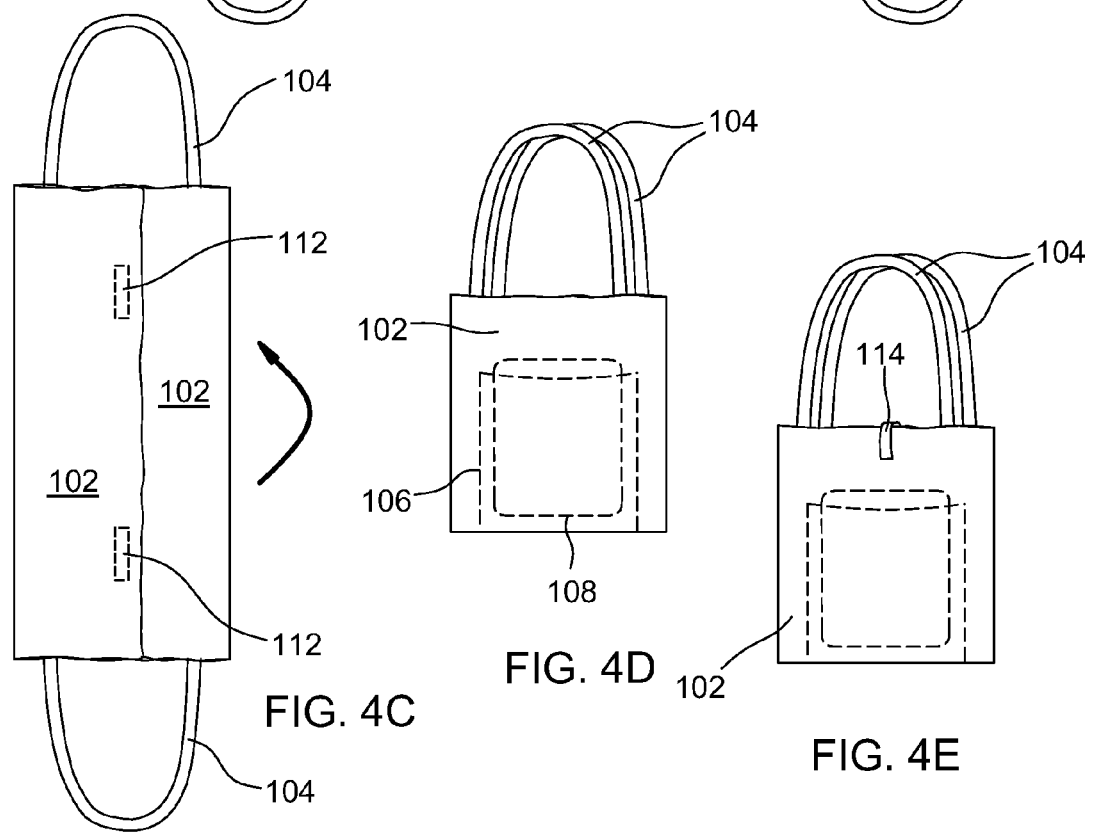
FIG. 4A  FIG. 4B  FIG. 4C  FIG. 4D  FIG. 4E

COMBINATION COOLING PAD FOR A VEHICLE SEAT AND COOLED, DUAL-CONFIGURATION BAG

BACKGROUND

The field of the present invention relates to cooling pads and dual-configuration bags. In particular, a combination cooling pad and cooled, dual-configuration bag is disclosed herein.

A wide variety of cooling pads, cooler bags, and convertible bags have been disclosed previously: some examples include:

U.S. Pat. No. 5,168,590 entitled "Therapeutic pillow cover having compartments for receiving hot/cold packs and/or pillow insert supports" issued Dec. 8, 1992 to O'Sullivan;

U.S. Pat. No. 5,833,309 entitled "Child car seat temperature control device and method" issued Nov. 10, 1998 to Schmitz;

U.S. Pat. No. 6,422,032 entitled "Reusable cooler bag" issued Jul. 23, 2002 to Greene;

U.S. Pat. No. 7,097,244 entitled "Thermal protective apparatus and method for a child car seat" issued Aug. 29, 2006 to Holmgren et al;

U.S. Pat. No. 7,131,689 entitled "Automotive vehicle seating comfort system" issued Nov. 7, 2006 to Brennan et al;

U.S. Des. Pat. No. D513,146 entitled "Car seat cooling blanket" issued Dec. 27, 2005 to Griffin;

U.S. Pat. Pub. No. 2003/0057750 entitled "Car seat cooler" published Mar. 27, 2003 in the name of Blackler; and U.S. Pat. Pub. No. 2005/0039260 entitled "Combined totebag, seat cushion, blanket" published Feb. 24, 2005 in the name of Tyler.

A previous car seat cooler pad is described at www.babybecool.com/products.html and www.babybeecool.com/faq.html, and includes a flexible pad with pockets for frozen ice blocks for cooling a baby or child car seat. The pad can be folded into a dual-compartment bag. A strap is secured over a headrest to keep the pad in place on the car seat.

It is desirable to provide a cooling pad for a vehicle seat that can cool an adult-sized vehicle seat. It is desirable to provide a cooling pad for a vehicle seat that can be variously configured as a single- or dual-compartment bag with a pair of handles. It is desirable that one of the handles can be used to hang the cooling pad from a headrest of the vehicle seat.

SUMMARY

A combination cooling pad and bag comprises a flexible pad with at least one pocket, a corresponding cooling pack received within each pocket, a pair of looped handles attached to opposing edges of the pad, and first and second closure mechanisms. The first closure mechanism is disposed along the edges of the pad, and the second closure mechanism is disposed on at least one surface of the pad. At least one of the handles is sized so as to loop around a vehicle seat headrest. The pad is sized and shaped, with both the first and second closure mechanisms disengaged, so as to cover a substantial portion of the seat and backrest portions of the vehicle seat when suspended from the handle looped around the headrest. The pad, handles, and first closure mechanism are arranged, with the first closure mechanism engaged and with the pad in a single-fold configuration, to form a single-compartment bag with the pair of handles positioned next to one another at the top edge of the bag. The pad, handles, and second closure mechanism are arranged, with the second closure mechanism engaged and with the pad in a multiple-fold configuration, to form a dual-compartment bag with the pair of handles positioned next to one another at the top edge of the bag.

Objects and advantages pertaining to combination cooling pads and cooled bags may become apparent upon referring to the exemplary embodiments illustrated in the drawings and disclosed in the following written description or appended claims.

BRIEF DESCRIPTION OF THE DRAWINGS

FIGS. 3A and 3B illustrates schematically a combination cooling pad and dual-configuration bag being folded into a single-compartment bag configuration.

FIGS. 4A-4E illustrates schematically a combination cooling pad and dual-configuration bag being folded into a dual-compartment bag configuration.

The embodiments shown in the Figures are exemplary, and should not be construed as limiting the scope of the present disclosure or appended claims.

DETAILED DESCRIPTION OF EMBODIMENTS

Figure 1:
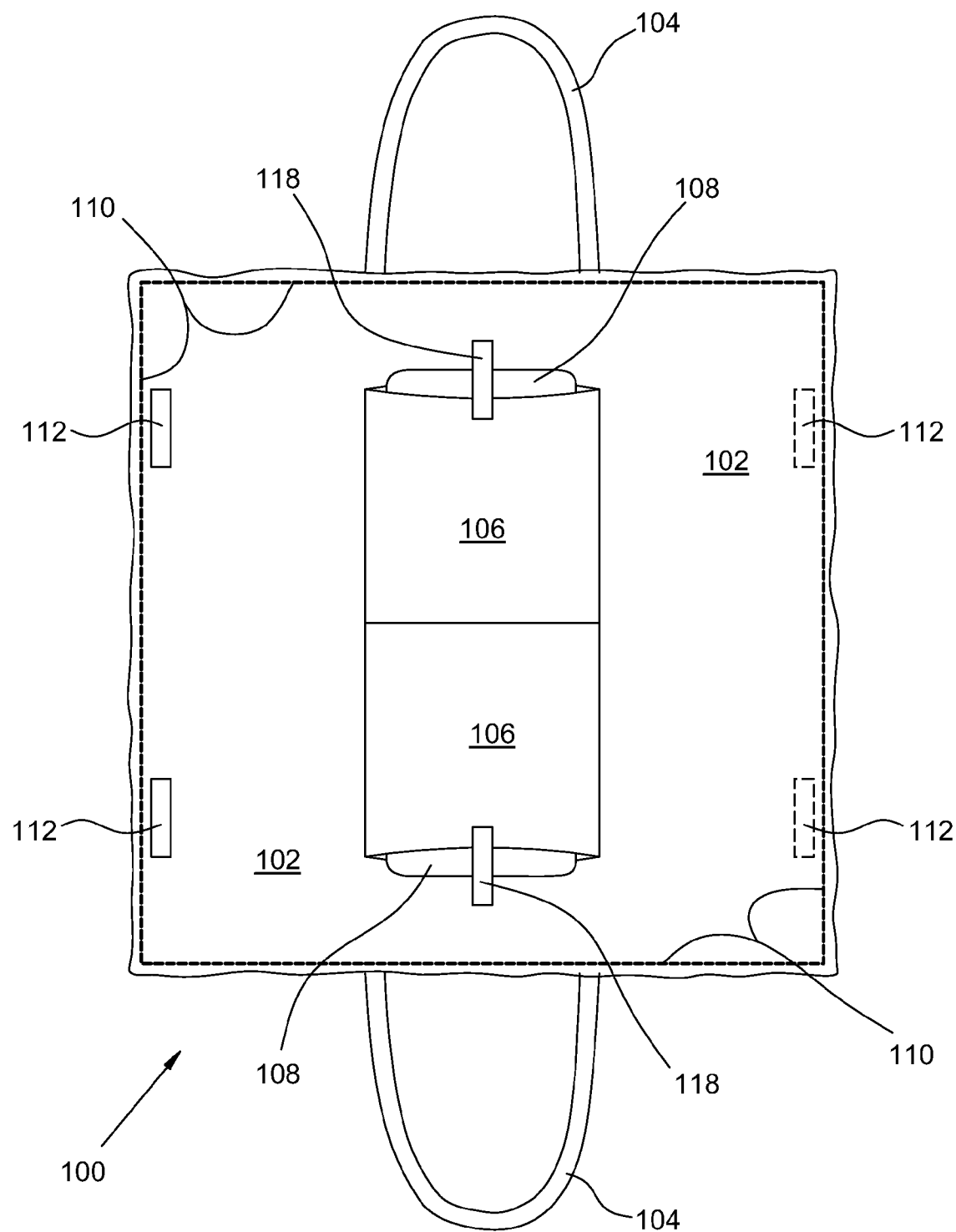
FIG. 1 illustrates schematically a combination cooling pad and dual-configuration bag in an unfolded arrangement.

A combination cooling pad and bag 100 is illustrated schematically in FIG. 1, and comprises a fabric pad 102 having a pair of looped handles 104 attached to opposing edges of pad 102. A first closure mechanism 110 is provided around the edges of pad 102, and a second closure mechanism 112 is provided on one or both surfaces of pad 102. In one surface of pad 102 are formed two pockets 106. Each pocket 106 receives a corresponding cooling pack 106.

Figure 2:
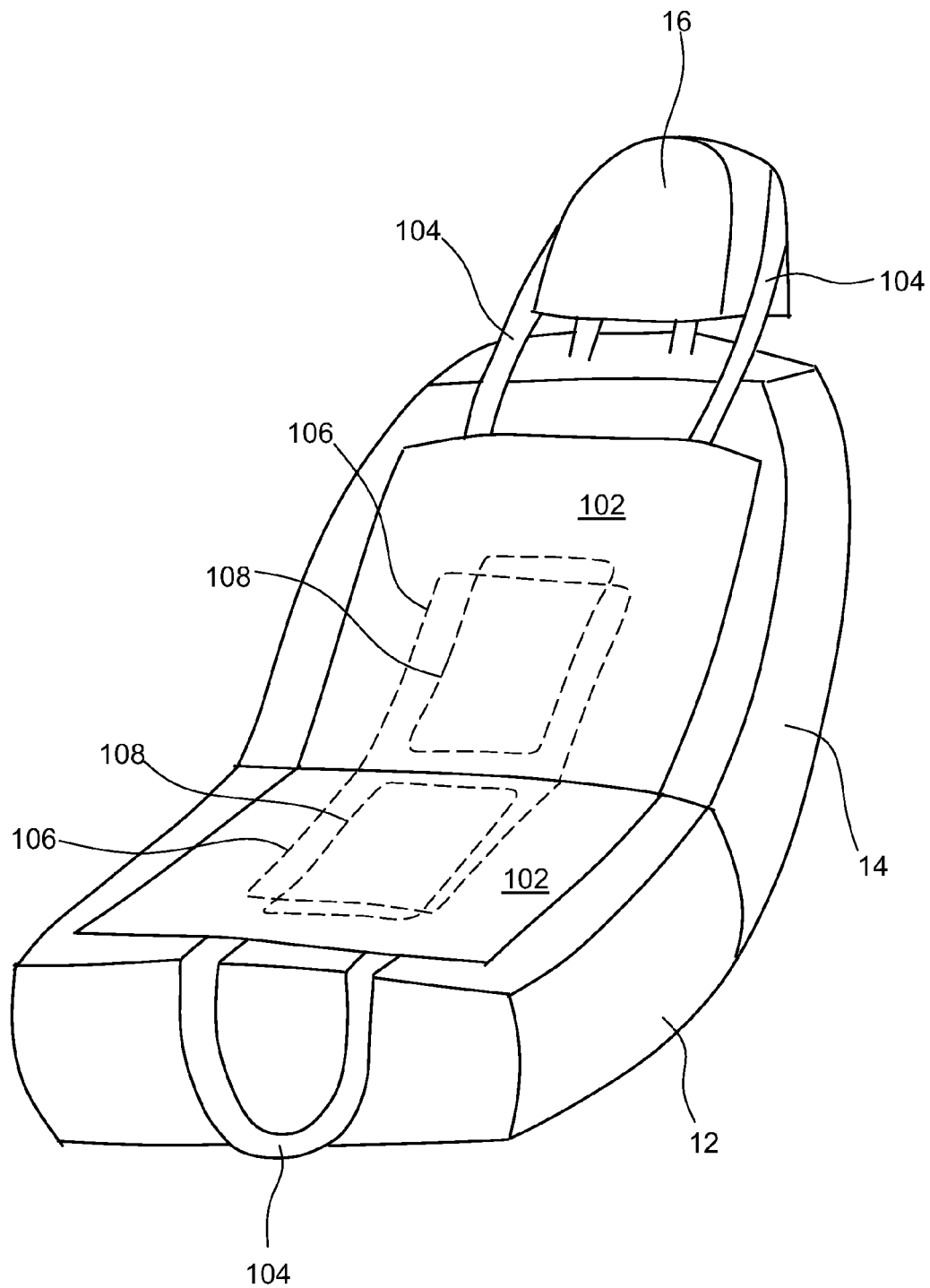
FIG. 2 illustrates schematically a combination cooling pad and dual-configuration bag arranged to cool a vehicle seat.

As illustrated schematically in FIG. 2, one or both of handles 104 is sized to fit around a headrest 16 of a vehicle seat 10. "Vehicle seat" indicates a seat that forms part of the standard interior of a passenger vehicle such as a car, van, light truck, bus, or truck cab, and is sized to accommodate a typical adult driver or passenger, as opposed to an infant or child car seat that might be installed in or on one of the vehicle's passenger seats. With handle 104 looped around headrest 16, pad 102 is suspended from handle 104 and covers substantial portions of the backrest portion 14 and the seat portion 12 of vehicle seat 10. Although FIG. 2 shows handle 104 looped around the back of headrest 16, it is also possible that handle 104 could loop around the bars supporting headrest 16; thus, the term "headrest" is intended to refer to any part of the headrest including its supporting bars as needed. Cooling packs 108 in pockets 106 are therefore positioned to cool portions of vehicle seat 10, typically on the downward-facing side of the pad between the pad and the vehicle seat. The number, relative sizes, and location of pockets 106 and cooling packs 108 shown in the drawings is exemplary, and any of those can be varied in any suitable way within the scope of the present disclosure or appended claims. For example, although FIG. 2 shows pockets 108 on the downward-facing surface of pad 102, the pad can be designed to orient pockets 108 on the upward-facing surface of pad 102 or to allow the user to choose either orientation, or pockets 108 can be on both surfaces, as desired.

Cooling packs 108 typically comprise a sealed container filled with a fluid that can be frozen in a standard kitchen freezer. The containers can comprise rigid or flexible plastic, rubber, or other polymer or resin, or can comprise metal or any other suitable or desirable material. The fluid can comprise water, salt water, glycol and water, alcohol and water, any of various gel materials typically used for such purposes, or any other suitable or desirable fluid. A non-toxic fluid is typically preferred. If a flexible container is used with a gel that remains flexible when frozen, then cooling packs 108 will be flexible when removed from a freezer for use. If a rigid container is used or if a fluid is employed that hardens when frozen, then cooling packs 108 will be rigid when removed from a freezer for use. The frozen cooling packs 108 are placed into their respective pockets 106 for use. When pad 102 with cooling packs 108 in pockets 106 is placed on a hot vehicle seat 10, e.g., after the vehicle has been parked for some length of time in the heat or sunshine, the arrangement cools the surface of the vehicle seat or seatbelt hardware. After several minutes or more of such cooling, a driver or passenger of the vehicle can sit in vehicle seat 10 without being burned or discomforted by the hot seat or seat belt hardware.

Pad 102 with cooling packs 108 in pockets 106 can be placed on a vehicle seat (as in FIG. 2) upon parking the car in a hot or sunny location, to prevent the seat or hardware from becoming excessively warm or hot. The length of time over which the cooling pad is effective under such circumstances depends on the temperature in the vehicle, the volume of cooling packs 108, and the heat of fusion or specific heat of the fluid in the cooling packs. A vehicle seat can be kept within a person's comfort range for several hours or more on a sunny summer day in Phoenix, Ariz., with a pair of gel-filled cooling packs of 0.5 to 1 liter capacity each, for example.

When not in use on a vehicle seat, combination cooling pad and bag 100 can be configured into one of two alternative bag arrangements. To configure pad 102 into a first bag arrangement, pad 102 is folded so as to bring the two handles 104 together and the first closure mechanism 110 is engaged to form a single-compartment bag (as in FIGS. 3A and 3B). First closure mechanism 110 typically comprises a zipper around the edge of pad 102 (or near the edge). The zipper can be advantageously arranged to close from both ends, thereby allowing bag 100 to be opened at its top without separating its sides. Any other suitable or desirable zipper arrangement can be employed. Any other suitable or desirable closures or fasteners can be used in any suitable or desirable arrangement, including but not limited to buttons, snaps, clasps, buckles, ties, hook-and-loop fasteners (e.g., Velcro®), and so forth. It is preferred, however, that closure mechanism 110 be such as to close the edges around the bottom and sides of the compartment formed by the bag. When the cooling pad arrangement or a different bag arrangement is desired, first closure mechanism 110 is disengaged and pad 102 is unfolded.

To configure pad 102 into a second bag arrangement, pad 102 is folded twice along substantially parallel folds that run between the opposing edges of pad 102 that bear handles 104 (as in FIGS. 4A-4C) and the second closure mechanism 112 is engaged. Second closure mechanism 112 typically comprises a set of hook-and-loop fasteners (e.g., Velcro®) arranged on a least one surface of pad 102. Any other suitable or desirable closures or fasteners can be used in any suitable or desirable arrangement, including but not limited to zippers, buttons, snaps, clasps, buckles, ties, and so forth. Pad 102 is folded again so as to bring the two handles 104 together to form a dual-compartment bag (as in FIGS. 4D and 4E).

In the dual-compartment configuration shown in FIG. 4D, bag 100 forms two compartments of smaller size than the single large compartment when bag 100 is folded into a single compartment form shown in FIG. 3B. The smaller size can be useful in carrying smaller items that might be suited for a vertical orientation and should not be turned upside down or sideways, especially liquid containers such as baby bottles, wine bottles, or soft drink bottles. Although reference is made herein to a "dual-compartment" bag in the folded configuration, it is contemplated that one or both compartments might be used. For example, bag 100 can be designed so that all four edges adjacent to and outside of handles 104, and the material adjacent to one of the two handles 104, fasten together (such as with snaps or a clip), so that only one compartment can be accessed between the fastened-together edges and the other handle 104.

An additional closure mechanism 114 (a strap with a fastener in the example in FIG. 4E) can be employed to maintain this last fold to form dual-compartment bag 100, or dual-compartment bag 100 can be maintained in its folded arrangement simply by being carried by both handles 104. When the cooling pad arrangement or the other bag arrangement is desired, second closure mechanism 112 is disengaged (along with additional closure mechanism 114, if present) and pad 102 is unfolded.

In either configuration, single- or dual-compartment, the bag 100 can be used without the cooling packs 108 in the pockets 106. Alternatively, cooling packs 108 can be placed within pockets 106 in the bag 100 to keep the contents of the bag cool. This can be useful for, e.g., carrying perishable foodstuffs in the bag. There is synergistic benefit from including cooling packs 108 in pockets 106, which are folded to the inside of dual-configuration bag 100, when used in the form shown in FIG. 4D or 4E, and when the bag is used in the smaller format to carry liquids such as beverages, in a vertical orientation, as explained above.

Pad 102 can comprise any one or more layers of suitably durable, flexible material, including a variety of natural or synthetic cloth or fabrics, or plastic materials. In one example, polyester fabric with a polyvinyl chloride backing is employed; in another example, cotton fabric is employed. It can be advantageous for pad 102 to act as an insulator, e.g., for keeping a vehicle seat cool or for keeping the contents of the bag cool. Insulating properties can be imparted in any suitable way, for example, by quilting an insulating layer between outer layers of the pad or by constructing the pad from insulating materials. Insulating materials can include fibrous batting, foam sheets or particles, and so forth. Any suitable or desirable combination of layers or materials can be employed.

Pockets 106 can be suitably sized and shaped for accommodating cooling packs 108. Pockets 106 can include a pocket closure for retaining the corresponding cooling pack 108 inside. Such a pocket closure can comprise a hook-and-loop fastener (e.g., a Velcro® fastener), or any other suitable or desired fastener or closure, including those already recited elsewhere herein. In the exemplary embodiment shown in the figures, a strap 118 with a fastener is employed as a closure for pocket 106. Pockets 106 can be provided with an optional water-proof, water-resistant, or absorbent liner, if desired. Such a liner can be advantageously employed when condensation from cooling pack 108 might be problematic or inconvenient, for example. Such a liner can be removable from pocket 106, can be substantially permanently secured within pocket 106, or can be integrally formed with pocket 106.

Figure 5:
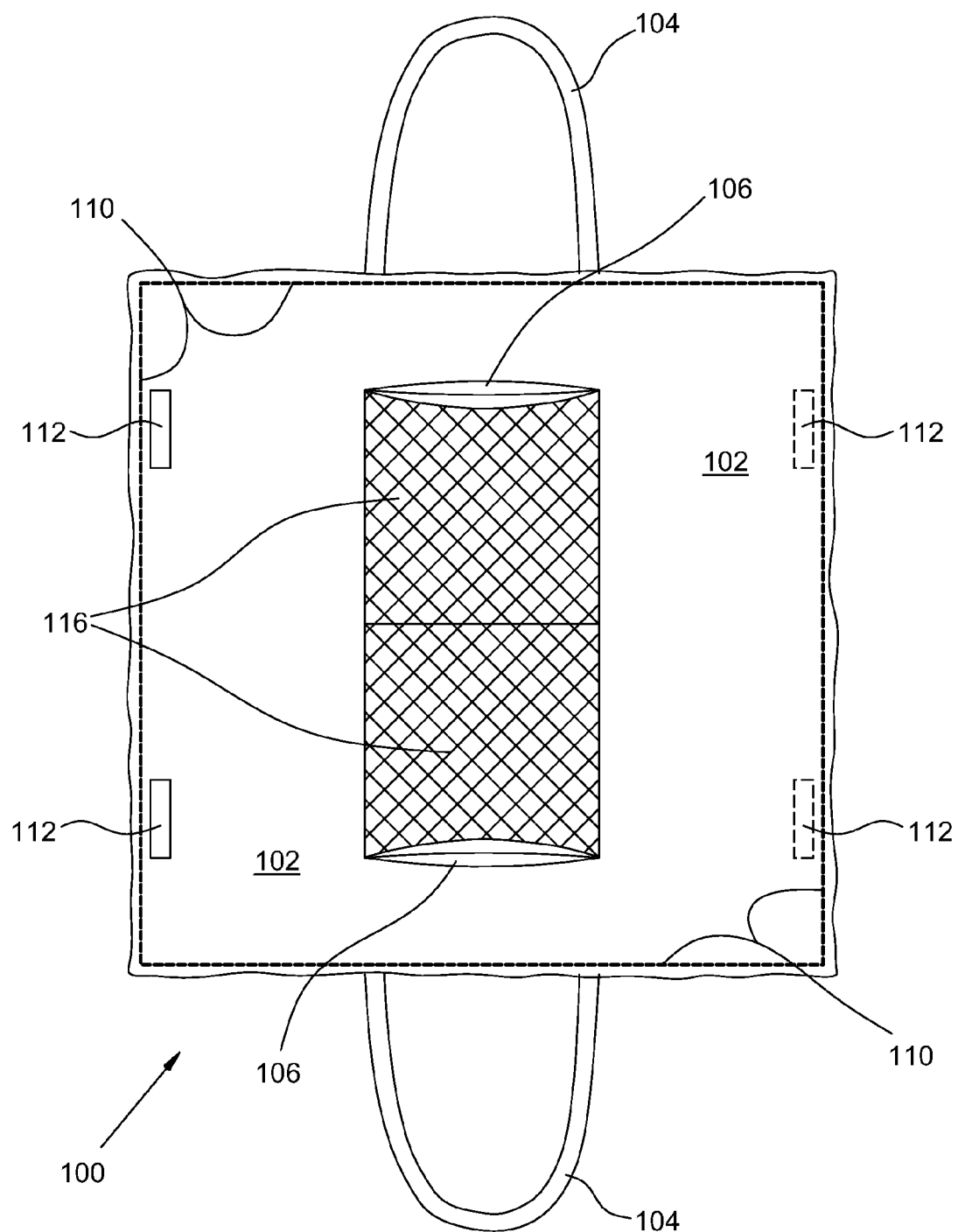
FIG. 5 illustrates schematically a combination cooling pad and dual-configuration bag with additional storage pockets in an unfolded arrangement.

One or more additional optional storage pockets can be provided on pad 102 for retaining various stored articles within bag 100. In the exemplary embodiment of FIG. 5, such additional pockets are shown as mesh pockets 116 overlying pockets 106. Such additional storage pockets can comprise any suitable material and can be of any desired size, shape, position, or number and can be designed to be folded on the inside of bag 100 when the bag is in folded configurations (as shown in FIG. 5) or on the outside of bag 100.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

What is claimed is:

1. A method comprising:
   (a) placing at least one cooling pack into a corresponding pocket on a fabric pad, the fabric pad having a pair of looped handles attached to opposing edges of the pad, a first closure mechanism disposed along the edges of the pad, and a second closure mechanism disposed on at least one surface of the pad;
   (b) looping a handle attached to one edge of the pad over a headrest of a vehicle seat, with both the first and second closure mechanisms disengaged, so that the pad is suspended from the handle looped around the headrest and covers a substantial portion of the seat and backrest portions of the vehicle seat;
   (c) removing the pad from the seat and the handle from the headrest;
   (d) folding the pad once to bring the pair of handles together;
   (e) engaging the first closure mechanism to form a single-compartment bag;
   (f) disengaging the first closure mechanism and unfolding the pad;
   (g) folding the pad twice along substantially parallel folds that run between the opposing edges of the pad that bear the handles;
   (h) engaging the second closure mechanism; and
   (i) folding the pad once to bring the pair of handles together to form a bag.

2. The method of claim 1 wherein the pad is insulated.

3. The method of claim 1 wherein the first closure mechanism comprises a zipper.

4. The method of claim 1 wherein the second closure mechanism comprises a hook-and-loop fastener.

5. The method of claim 1 wherein each cooling pack comprises a plastic container filled with frozen fluid.

6. The method of claim 1 wherein each pocket includes a water-proof, water-resistant, or absorbent lining.

7. The method of claim 1 wherein each pocket includes a closure mechanism for retaining the corresponding cooling pack therein.

8. The method of claim 1 wherein further comprising a storage pocket on the pad.

9. A method comprising:
   (a) placing at least one cooling pack into a corresponding pocket on a fabric pad, the fabric pad having a pair of looped handles attached to opposing edges of the pad, a first closure mechanism disposed along the edges of the pad, and a second closure mechanism disposed on at least one surface of the pad;
   (b) looping a handle attached to one edge of the pad over a headrest of a vehicle seat, with both the first and second closure mechanisms disengaged, so that the pad is suspended from the handle looped around the headrest and covers a substantial portion of the seat and backrest portions of the vehicle seat;
   (c) removing the pad from the seat and the handle from the headrest;
   (d) folding the pad twice along substantially parallel folds that run between the opposing edges of the pad that bear the handles;
   (e) engaging the second closure mechanism;
   (f) folding the pad once to bring the pair of handles together to form a bag;
   (g) disengaging the second closure mechanism and unfolding the pad;
   (h) folding the pad once to bring the pair of handles together; and
   (i) engaging the first closure mechanism to form a single-compartment bag.

10. The method of claim 9 wherein the pad is insulated.

11. The method of claim 9 wherein the first closure mechanism comprises a zipper.

12. The method of claim 9 wherein the second closure mechanism comprises a hook-and-loop fastener.

13. The method of claim 9 wherein each cooling pack comprises a plastic container filled with frozen fluid.

14. The method of claim 9 wherein each pocket includes a water-proof, water-resistant, or absorbent lining.

15. The method of claim 9 wherein each pocket includes a closure mechanism for retaining the corresponding cooling pack therein.

16. The method of claim 9 wherein further comprising a storage pocket on the pad.

* * * * *